April 21, 1953 J. E. HOLLIS 2,635,592
COOLING SYSTEM FOR INTERNAL-COMBUSTION ENGINES
Filed May 15, 1950 2 SHEETS—SHEET 1
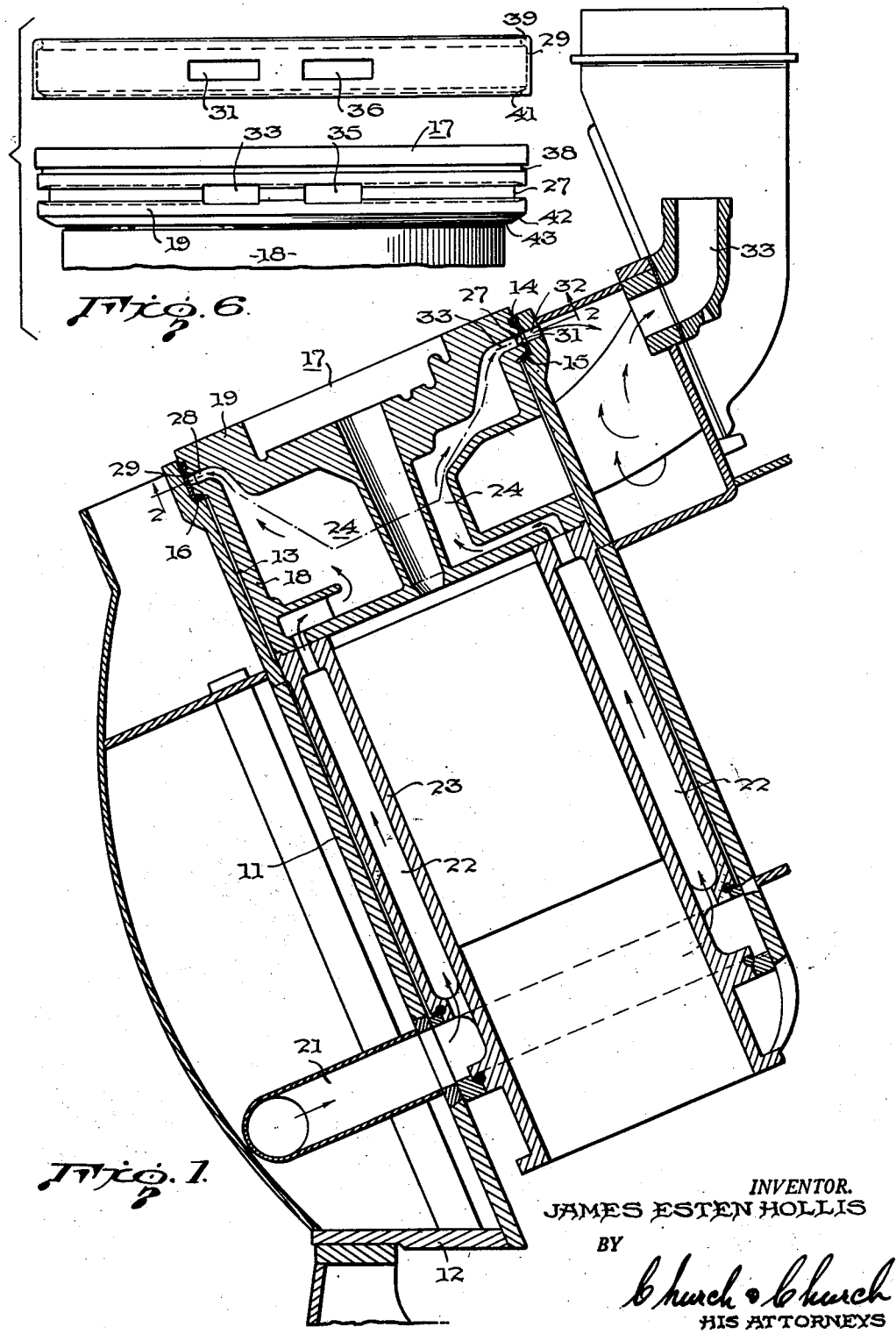
INVENTOR.
JAMES ESTEN HOLLIS
BY
Church & Church
HIS ATTORNEYS

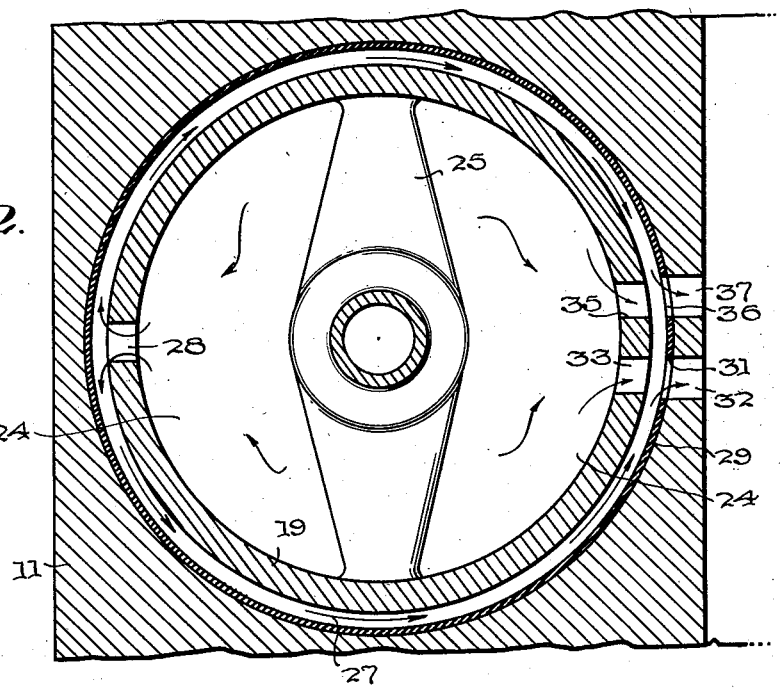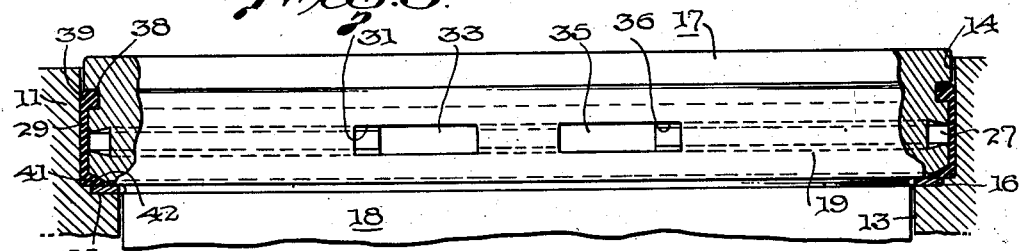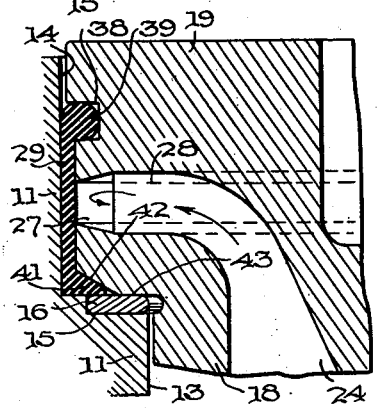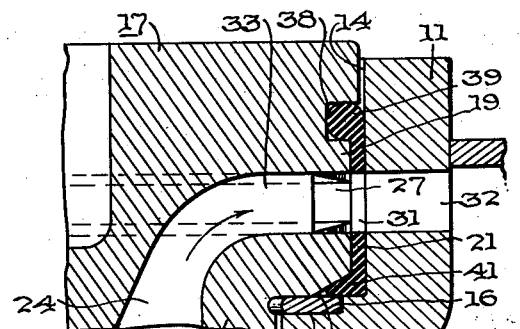

Patented Apr. 21, 1953

2,635,592

UNITED STATES PATENT OFFICE 2,635,592

COOLING SYSTEM FOR INTERNAL-COMBUSTION ENGINES

James Esten Hollis, Fort Worth, Tex.; Lillian A. Hollis, administratrix of said James Esten Hollis, deceased, assignor to Lillian A. Hollis, Fort Worth, Tex.

Application May 15, 1950, Serial No. 162,020

14 Claims. (Cl. 123—41.82)

This invention relates to the cooling system of an internal combustion engine and particularly concerns an improved water passage and gasket construction for cooling the peripheral portion of a head in the cylinder of a diesel engine.

In some types of diesel engines, a cylindrical head is inserted in the open end of the cylinder bore. This head usually is of less diameter than the diameter of the cylinder bore so an annular chamber surrounds the exposed end of the head. Diametrically opposed ports in the head communicate with water passages within the head. One port usually is in registration with the port of an outlet water passage in the block. Neoprene rubber ring seals positioned between the head and the block above and below these ports seal off the chamber so water circulates in both directions around the periphery of the head to the discharge outlet. As a result of the circulation of water in the chamber between the cylinder head and block, pits are formed in the block and leaks develop on the block side of the neoprene rubber seals.

It is the major object of this invention to eliminate wear on the block as the result of water circulation around the head and to prevent leakage of water from the cooling chamber between the block and the head. More specifically, an object of this invention is to provide for circulation of water around the periphery of the head without having the water contact the cylinder wall of the block.

In the attainment of these objects one important feature of the invention resides in the formation of an annular groove in the peripheral surface of the head near its exposed end and a gasket surrounding this groove, which gasket is provided with an opening registering with the outlet port in the block so water circulating in the groove is sealed off from the block by the gasket surrounding the groove. Another feature of the invention resides in the formation of the gasket with a bead engaged in a peripheral recess in the head between the groove and the exposed end of the head, as well as the formation of an inwardly projecting flange on the bottom of the gasket, which flange fills the space between a step on the cylinder wall and a beveled corner of a shoulder on the head.

Other objects and advantages of the invention will become apparent from the following specification taken in connection with the accompanying drawings wherein:

Figure 1 is a vertical cross-sectional view through a cylinder of a diesel engine illustrating a preferred embodiment of the invention;

Fig. 2 is an enlarged sectional view taken on the line 2—2 of Fig. 1;

Fig. 3 is an enlarged fragmentary view of a cylinder head embodying the invention, some parts being shown in section and others broken away for purposes of clearness;

Fig. 4 in an enlarged fragmentary sectional view showing one side of the head and an outlet port therein;

Fig. 5 is a view similar to Fig. 4, but showing the opposite side of the head and the port therein; and Fig. 6 is an exploded view of a cylinder head and gasket embodying the invention.

As illustrated in Fig. 1, the engine has a block 11 extending upwardly from crank case 12 and having a bore 13 extending through the block. At its open end, the block is formed with an enlarged counterbore 14 to provide, near the upper end of the bore, a circular step 15 lined with a brass wear ring 16. Fitted within the open end of bore 13 is a cylindrical head, indicated generally at 17, which head has a lower portion 18 of a diameter slightly smaller than the inner diameter of bore 13, and an outer portion 19 of a diameter slightly smaller than the inner diameter of counterbore 14. Water circulates from manifold 21 through passages 22, 22, in cylinder liner 23, into internal passages 24, 24, formed in the cylinder head 17. The upper part of cylinder head 17 is usually provided with a partition 25 so water flows outwardly through diametrically opposed ports in the cylinder head.

Heretofore, this water has circulated in the annular chamber between the walls of counterbore 14 and the outer periphery of outer portion 19 of the cylinder head. This water was sealed off by neoprene rings above and below the ports. Circulation of the water around the periphery of the head resulted in the wear and leakage through the block as previously described.

In accordance with the present invention, outer portion 19 of the cylinder head 17 is formed with a peripheral groove 27 having one port 28 communicating with one of the passages 24 in the interior of the cylinder head 17. Surrounding this peripheral groove 27 is an annular gasket 29 preferably formed of a wear resistant, flexible, resilient material such as neoprene rubber. In its preferred form, this gasket 28 fills the annular chamber between the block and the outer portion 19 of the cylinder head 17. Substantially diametrically opposite port 28 in the peripheral groove 27 is an opening 31 in the annular gasket 29. Thus, water flows from internal passage 24 through port 28 and in both directions around groove 27 to the opening 31. As the opening 31 is in registry with outlet port 32 in the block 11, the water passes through the block to water discharge passage 33.

As more water usually circulates through the block than may be accommodated in the small passage around the cylinder head, an additional port 33 is provided in the cylinder head substantially diametrically opposite the port 28 and in alinement with opening 31 in the gasket and discharge port 32 in the block. For additional capacity, an additional port 35, adjacent port 33, may be provided in the cylinder head. In registry with the additional port 35 is a corresponding opening 36 in the gasket and an outlet port 37 in the block.

As best illustrated in Fig. 3, opening 31 in the gasket has a greater area than port 33 in the cylinder head. The purpose of this is to provide for the egress of water from groove 27 in addition to the water emerging from port 33. Similarly, opening 36 in the gasket has a greater area than port 35.

As illustrated, the gasket 29 extends from circular step 15, with its brass wear ring 16, outwardly of the cylinder bore beyond the peripheral groove 27 in the cylinder head. To enhance the seal effected by the gasket 29 cylinder head 17 is formed with a peripheral gasket-receiving recess 38 between peripheral groove 27 and the exposed end of the head. A rib 39 on the inner side of the gasket 29 engages in recess 38 to firmly anchor the outer end of the gasket. At its bottom, gasket 29 has an inwardly turned flange 41 which engages beneath beveled corner 42 of circular shoulder 43 formed on the head at the junction of the larger outer portion 19 with the inner portion 18. Flange 41 thus seals the space between shoulder 43 and circular step 15 on the wall of the block.

When assembled as illustrated in the drawings, water flowing into the internal passages 24, 24, of the cylinder head 17 is divided into two courses by partition 25, one of which courses flows through port 28 into the groove 27 which is sealed off by the gasket 29. Water entering the groove flows in both directions around the cylinder head and through openings 31 and 36 where it joins with water from the other course passing through ports 33 and 35 to outlets 32 and 37 in the block. Thus, the water at no time engages the cylinder wall of the block. As the gasket 29 substantially fills the annular chamber between the exterior of the cylinder head and the interior of the cylinder wall, leakage is virtually eliminated.

What is claimed is:

1. In an internal combustion engine, a block having a cylindrical bore, the diameter of said bore being greater near the open end thereof forming a circular step within the bore, a cylindrical head disposed in the open end of said bore, a circular shoulder extending radially from said head and resting on said circular step, said head being formed with a peripheral groove between said shoulder and the exposed end of said head, said groove communicating with an internal water passage, and an annular gasket extending from said shoulder toward the exposed end of said head and surrounding said groove, said gasket being formed with an opening opposite said groove and communicating with a water passage in said block.

2. In an internal combustion engine, a block having a cylindrical bore, the diameter of said bore being greater near the open end thereof forming a circular step within the bore, a cylindrical head disposed in the open end of said bore, a circular shoulder extending radially from said head and resting on said circular step, the external diameter of said head from said shoulder to the exposed end being smaller than the internal diameter of said bore from said step to the open end to provide an annular chamber between said block and said head, said head being formed with a peripheral groove between said shoulder and the exposed end of said head, said groove communicating with an internal water passage, and an annular gasket in said chamber extending from said shoulder toward the exposed end of said head and surrounding said groove, said gasket being formed with an opening opposite said groove and communicating with a water passage in said block.

3. In an internal combustion engine, a block having a cylindrical bore, a cylindrical head disposed in the end of said bore, said head being formed with a peripheral groove, said groove having a port communicating with an internal water passage in said head, and an annular gasket surrounding said groove, said gasket being formed with an opening substantially diametrically opposite said port, said opening being positioned in a manner connecting said groove with a water passage in said block.

4. In an internal combustion engine, a block having a cylindrical bore, a cylindrical head disposed in said bore, said head being formed with a peripheral groove, said groove having a pair of substantially diametrically opposed ports communicating with an internal water passage in said head, and an annular gasket surrounding said groove, said gasket being formed with an opening in register with one of said ports, said opening being positioned in a manner connecting said groove with a water passage in said block.

5. In an internal combustion engine, the apparatus defined in claim 4 wherein said opening in the gasket has a greater area than said one port.

6. In an internal combustion engine, a block having a cylindrical bore, a cylindrical head disposed in the end of said bore, said head being formed with a peripheral groove providing a water passage around said head and having a port communicating with an internal water passage in said head having a gasket receiving peripheral recess between said groove and the exposed end of said head, an annular gasket surrounding said groove, and a head on said gasket engaged in said recess, said gasket being formed with an opening registering with said groove and communicating with a water passage in said block.

7. In an internal combustion engine, a block having a cylindrical bore, the diameter of said bore being greater near the open end thereof forming a circular step within the bore, a cylindrical head disposed in the open end of said bore, a circular shoulder extending radially from said head and resting on said circular step, said shoulder having a beveled corner, said head being formed with a peripheral groove between said shoulder and the exposed end of said head, said groove communicating with an internal water passage, an annular gasket extending from said shoulder toward the exposed end of said head and surrounding said groove, and a flange on the bottom of said gasket extending beneath said beveled corner, said gasket being formed with an opening opposite said groove and communicating with a water passage in said block.

8. In an internal combustion engine, a block having a cylindrical bore, the diameter of said bore being greater near the open end thereof forming a circular step within the bore, a cylindrical head disposed in the open end of said bore, a circular shoulder extending radially from said head and resting on said circular step, said head being formed with a peripheral groove between said shoulder and the exposed end of said head providing a water passage around said head, said groove having a port communicating with an internal water passage, said head having an annular gasket receiving peripheral recess between said groove and the exposed end of said head, an annular gasket extending from said shoulder toward the exposed end of said head and surrounding said groove, and a head on said gasket engaged in said recess, said gasket being formed with an opening opposite said groove and communicating with a water passage in said block.

9. In an internal combustion engine, a block having a cylindrical bore with a larger counterbore at its open end forming a circular step within the bore, a cylindrical head disposed in the open end of said bore, a circular shoulder extending radially from said head and resting on said step, said shoulder having a beveled corner, said head being formed with a peripheral groove between said shoulder and the exposed end of said head providing a water passage around said head, said groove having a port communicating with an internal water passage, said head having a gasket receiving peripheral recess between said groove and the exposed end of said head, an annular gasket surrounding said head and extending from said shoulder to said recess, an inwardly projecting flange on said gasket engaging said beveled corner, and a bead on said gasket engaging said recess, said gasket being formed with an opening substantially diametrically opposite said port and registering with said groove to connect said groove with a water passage in said block.

10. In an internal combustion engine, a block having a cylindrical bore with a larger counterbore at its open end forming a circular step within the bore, a cylindrical head disposed in the open end of said bore, a circular shoulder extending radially from said head and resting on said step, said shoulder having a beveled corner, the external diameter of said head between said shoulder and the exposed end of said head being less than the internal diameter of said counterbore to provide an annular chamber around said head, said head being formed with a peripheral groove between said shoulder and the exposed end of said head providing a water passage around said head, said groove having a port communicating with an internal water passage, said head having a gasket receiving peripheral recess between said groove and the exposed end of said head, an annular gasket in said chamber surrounding said head and extending from said shoulder to said recess, an inwardly projecting flange on said gasket engaging said beveled corner, and a head on said gasket engaging said recess, said gasket being formed with an opening substantially diametrically opposite said port and registering with said groove to connect said groove with a water passage in said block.

11. In an internal combustion engine, a block having a cylindrical bore with a larger counterbore at its open end forming a circular step within the bore, a cylindrical head disposed within the open end of said bore, a circular shoulder extending radially from said head and resting on said step, said shoulder having a beveled corner, said head being formed with a peripheral groove between said shoulder and the exposed end of said head providing a water passage around said head, said groove having a pair of substantially diametrically opposed ports communicating with an internal water passage, said head having a gasket receiving peripheral recess between said groove and the exposed end of said head, an annular gasket surrounding said head and extending from said shoulder to said recess, an inwardly projecting flange on said gasket engaging said beveled corner, and a bead on said gasket engaging said recess, said gasket being formed with an opening in register with one of said ports, said opening being positioned in a manner connecting said groove with a water passage in said block.

12. In an internal combustion engine, the apparatus defined in claim 11 wherein said opening in the gasket has a greater area than said one port.

13. In an internal combustion engine having a block with a cylindrical bore and a cylindrical head in the open end of said bore, the head being of less diameter than said bore to provide an annular chamber around the head, a groove in the head having substantially diametrically opposite ports communicating with internal water passages, one of said ports registering with a port in the block communicating with a water passage in the block, a gasket comprising an annular ring of wear resisting flexible resilient material, said ring being of a thickness corresponding to the thickness of said chamber and of a height greater than the height of said groove, a flange on the bottom of said ring, and a rib on the top of said ring engaging an annular recess in said head, said ring being formed with an opening registering with said port in the block and said one port in the head so water circulates from the other port in said head around said groove and through said opening to the port in the block.

14. In an internal combustion engine, the apparatus defined in claim 13 wherein the opening in said head around said groove and through said port in the head.

JAMES ESTEN HOLLIS.

References Cited in the file of this patent

UNITED STATES PATENTS

| Number | Name | Date |
|---|---|---|
| 1,372,916 | Spelts | Mar. 29, 1921 |
| 1,434,348 | Bull | Oct. 31, 1922 |
| 1,442,523 | Goby | Jan. 16, 1923 |
| 1,575,638 | Pochobradsky | Mar. 9, 1926 |
| 1,622,813 | Schneider | Mar. 29, 1927 |
| 1,968,110 | Walker | July 31, 1934 |
| 2,065,602 | Meyer | Dec. 29, 1936 |

FOREIGN PATENTS

| Number | Country | Date |
|---|---|---|
| 128,940 | Great Britain | Mar. 18, 1920 |